United States Patent [19]
Blankenship et al.

[11] Patent Number: 5,584,618
[45] Date of Patent: Dec. 17, 1996

[54] PNEUMATICALLY ACTUATED DRILL MOTOR AND AN ASSOCIATED METHOD AND APPARATUS FOR CLAMPING THE DRILL MOTOR TO A DRILL PLATE

[75] Inventors: Thomas O. Blankenship, O'Fallon; David L. Fritsche, St. Charles; Stanley V. Tiefenbrun, St. Louis, all of Mo.

[73] Assignee: McDonnell Douglas Corporation, St. Louis, Mich.

[21] Appl. No.: 437,846

[22] Filed: May 9, 1995

[51] Int. Cl.⁶ .......................... B23B 45/14; B23B 51/06; B23B 47/34
[52] U.S. Cl. .............................. 408/1 R; 408/56; 408/67; 408/72 R; 408/80; 408/111
[58] Field of Search ............................ 408/1 R, 56, 67, 408/72 R, 79–82, 110–112, 702

[56] References Cited

U.S. PATENT DOCUMENTS

| | | |
|---|---|---|
| 1,946,584 | 2/1934 | Judge . |
| 2,839,953 | 6/1958 | Hanger . |
| 2,935,905 | 5/1960 | Winslow . |
| 4,286,902 | 9/1981 | Sagliano et al. . |
| 4,396,318 | 8/1983 | Jensen et al. . |
| 4,601,222 | 7/1986 | Gill ............................................ 408/82 |
| 4,740,117 | 4/1988 | Deleury et al. . |
| 5,033,917 | 7/1991 | McGlasson et al. . |
| 5,161,923 | 11/1992 | Reccius . |
| 5,395,187 | 3/1995 | Slesinski et al. ...................... 408/72 R |
| 5,482,411 | 1/1996 | McGlasson ............................... 408/56 |

OTHER PUBLICATIONS

Layout, NDS JIG Collect Foot, 15 QDA–5150 & 5275, Dwg. No. 4525, Dresser Industries, Inc. Nov. 30, 1984.
Nurlock Catalog, p. 242, Telescoping Bushing Tips.

*Primary Examiner*—Steven C. Bishop
*Attorney, Agent, or Firm*—Bell, Seltzer, Park & Gibson, P.A.

[57] ABSTRACT

A clamping device includes a housing, removably connected to a drill motor, which has a first end portion adapted to be received within an aperture defined in a drill plate. The first end portion of the housing also defines a number of openings in which respective ones of a plurality of ball bearings are disposed. The clamping device also includes means for forcing each ball bearing outwardly within a respective opening defined in the first end portion of the housing such that portions of the ball bearings are extended outwardly beyond the housing and are urged against the drill plate. Thus, the drill motor can be securely clamped to the drill plate. The clamping device can also include a mandrel defining an internal bore through which the cutting element extends. The mandrel typically has an exterior surface in which a plurality of recesses are defined. Each recess can be aligned with a respective opening defined in the housing and can be adapted to receive a respective ball bearing. Each recess can also include an inclined surface extending from a first end outwardly to a second end such that by urging a respective ball bearing outwardly along the inclined surface from the first end to the second end, the ball bearing is extended outwardly beyond the housing so as to secure the clamping device and, in turn, the drill motor to the drill plate during drilling operations.

36 Claims, 6 Drawing Sheets

PNEUMATICALLY ACTUATED DRILL MOTOR AND AN ASSOCIATED METHOD AND APPARATUS FOR CLAMPING THE DRILL MOTOR TO A DRILL PLATE

FIELD OF THE INVENTION

The present invention relates to a drill motors and, more particularly, to clamping devices and associated methods for securing a drill motor to a drill plate.

BACKGROUND OF THE INVENTION

Many applications, such as automotive and aircraft fabrication, require precisely positioned holes to be drilled in a workpiece. The holes must be accurately aligned with only relatively small positioning errors tolerable. Accordingly, a drill plate is typically aligned and mounted in a fixed relation to the workpiece prior to drilling holes in the workpiece. The drill plate has one or more accurately positioned holes extending therethrough such that by properly aligning the drill plate with respect to the workpiece, a hole in the drill plate precisely overlies the desired location for a corresponding hole to be drilled in the workpiece.

In many instances, it is desirable to attach the drill motor to the drill plate such that the operator does not have to offset the full weight of the drill motor and the thrust generated during the drilling operation. Attachment of the drill motor to the drill plate further ensures proper alignment of the cutting tool with the desired hole location in the workpiece. In many instances, the accurately positioned holes must be drilled in relatively hard materials, such as titanium, or in large quantities, such as in aluminum or composite materials. To drill holes in such situations, it is generally desirable to use power feed or rack feed drill motors which produce relatively great amounts of axial thrust and can be used repeatedly without fatiguing the operator. Typically, these motors are internally designed so that the drill spindle and cutting tool are actuated with pneumatic and/or hydraulic power or with the assistance of a rack and pinion drive. Since these motors are generally heavy and produce a relatively great amount of thrust, however, the drill motor is generally firmly clamped to a drill plate and the drill plate is, in turn, firmly clamped to the workpiece. Accordingly, the affixation of a drill motor to a drill plate eliminates the need for the drill motor operator to apply axial pressure during the drilling operation.

Power feed drill motors are commonly attached to a drill plate by means of lock screws, lock buttons or specially designed liner bushings. For example, a pair of lock screws can be positioned on opposite sides of an aperture defined in the drill plate. Lock screws typically have an unthreaded portion underlying the slotted head for receiving a corresponding flange of a locking drill bushing that is mounted to the nose housing of a drill motor. Accordingly, the locking drill bushing of the drill motor is inserted into an aperture defined in a drill plate and is rotated so that the flange of the locking drill bushing is engaged and retained beneath the slotted head of the lock screws. The drill motor is thus affixed to the front surface of the drill plate.

The use of lock screws, lock buttons or specially designed liner bushings in the drill plate typically increases both the cost of the drill plates and the labor cost associated with installing and maintaining these drill plates. In addition, lock screws, lock buttons and liner bushings generally increase the size and weight of drill plates and preclude the close spacing or overlapping of apertures in the drill plate. Thus, additional or multiple drill plates may be required for fabricating a single part.

In order to securely clamp a drill motor to a drill plate without the use of lock screws, specially adapted sleeves and bushings have been designed for incorporation into the drill plate. Examples of such sleeves and bushings incorporated in drill plates include those described in U.S. Pat. No. 5,161,923 (the '923 patent) to Helmut Reccius on Nov. 10, 1992 and U.S. Pat. No. 4,740,117 (the '117 patent) to Marie-José Schaff Deleury et al. on Apr. 26, 1988. The drill plate described in the '923 patent includes a cylindrical protrusion extending outwardly from the front face of the drill plate and a recessed periphery about the aperture on the rear face of the drill plate to align and support the drill motor. The machine tool of the '923 patent includes a nosepiece having a number of longitudinal tongues. The tongues are adapted to expand within the aperture of the drill plate and be received within the recessed periphery of the aperture.

Further, the '117 patent discloses drill bushing inserts or sleeves within apertures defined in the drill plate. The inserts have a cylindrical portion extending outwardly from the front face of the drill plate about each aperture. The cylindrical portion has a flanged end for mating with the correspondingly designed drill motor. In particular, the drill motor has a plurality of protruding fingers having a flanged end portion adapted to mate with the flanged end of the cylindrical portion.

In addition, U.S. Pat. No. 2,839,953 (the '952 patent) to Randolph T. Hanger on Jun. 24, 1958 also incorporates a sleeve within the aperture defined in the drill plate. The drill bushing of the '952 patent is manually expanded within the tapered sleeve to attach the drill motor to the drill plate.

The fabrication of specially designed drill plates, however, increases the cost of the drill plates and the time required for their manufacture. The use of sleeves or bushings within the apertures of a drill plate also prevents the incorporation of overlapping apertures in the drill plate. In addition, such specially designed drill plates may generally only be used with drill motors having bushings designed to mate with the corresponding sleeves or bushings of the drill plate.

Drill bushings have also been specially designed for attachment to drill motors in order to clamp the drill motor to a drill plate. For example, U.S. Pat. No. 2,935,905 (the '905 patent) to J. C. Winslow on May 10, 1960 discloses a drill bushing adapted for extension through an aperture in a drill plate and for attachment thereto. The drill bushing of the '905 patent incorporates a pneumatically-actuated ram assembly for extending the drill bushing through the aperture in the drill plate. The ram assembly, however, is offset from the cutting tool. Accordingly, the drill bushing of the '905 patent may not readily access all areas of limited access.

Thus, while it would be desirable to securely clamp a drill motor to a drill plate in order to drill precisely aligned holes, the devices developed for such purposes still suffer from a number of deficiencies. These deficiencies include, for example, the need for specially designed bushings or sleeves in the drill plate and the inability to reach areas of limited lateral access. These deficiencies are particularly apparent in instances which require relatively large clamping forces including instances in which a drill motor must produce relatively large amounts of thrust such as, for example, drilling holes in relatively hard materials with power feed drill motors.

SUMMARY OF THE INVENTION

It is therefore an object of the invention to provide an improved method and apparatus for clamping a drill motor to a drill plate.

It is another object of the invention to provide an improved method and apparatus for clamping a drill motor to a relatively inexpensive drill plate which does not include costly locking components.

It is a more specific object of the invention to provide an improved method and apparatus for clamping a drill motor within an aperture defined in a drill plate wherein the internal diameter of the aperture can vary somewhat without diminishing the clamp-up force.

These and other objects are provided, according to the present invention, by a clamping device which includes a housing, removably connected to the drill motor, which has a first end portion which is adapted to be received within an aperture defined in the drill plate and which defines a plurality of openings in which respective ones of a plurality of ball bearings are disposed. The clamping device also includes clamping means for forcing each ball bearing outwardly within a respective opening defined in the first end portion of the housing such that portions of the ball bearings extend outwardly beyond the housing and are urged against the drill plate. Accordingly, the drill motor is clamped to the drill plate by the urging of the ball bearings outwardly against the drill plate.

The housing also includes an internal cavity opening through the first end portion in which a mandrel is at least partially disposed. The mandrel defines an internal bore through which a cutting element can extend and has an exterior surface in which a plurality of recesses are defined. Each recess is preferably aligned with a respective opening defined in the housing and is adapted to receive a ball bearing. Each recess also typically includes an inclined surface extending from a first end outwardly to a second end.

In order to urge each ball bearing outwardly beyond the housing, the clamping means of the present invention preferably includes means for urging each ball bearing outwardly along the inclined surface from the first end toward the second end. In one embodiment, the clamping means includes means for moving the mandrel relative to the housing such that each ball bearing moves outwardly along a respective inclined surface from the first end toward the second end.

The mandrel of one preferred embodiment defines a longitudinal axis extending therethrough. Each inclined surface of this embodiment extends both longitudinally and radially outward from the first end to the second end. Consequently, the means for moving the mandrel of this embodiment includes retraction means for longitudinally retracting the mandrel within the housing such that the plurality of ball bearings move outwardly along a respective inclined surface from the first end toward the second end.

In one embodiment, the housing defines at least one port extending therethrough. In addition, the retraction means of this embodiment can include a piston disposed within the housing and dividing the internal cavity of the housing into a rearward portion and a forward portion. The piston cooperatively engages the mandrel and is adapted for longitudinal movement therewith such that by introducing fluid, such as by a fluid supply means, through a port defined in the housing and into the forward portion of internal cavity, the piston is urged rearwardly and the mandrel is longitudinally retracted, thereby clamping the drill motor to the drill plate.

The clamping device of the present invention can also include releasing means for longitudinally extending the mandrel within the housing such that the plurality of ball bearings move inwardly along the respective inclined surface from the second end toward the first end. Thus, the drill motor is released from the drill plate. In one more specific embodiment, the releasing means includes fluid supply means for introducing fluid through a port defined in the housing and into the rearward portion of the internal cavity such that the piston is urged forwardly and the mandrel is longitudinally extended, thereby releasing the drill motor from the drill plate.

The clamping device of the present invention can also include a drill guide disposed within and, in some embodiments, slidably connected to the mandrel. The drill guide defines a longitudinally extending bore through which the cutting element extends. The clamping device can also include a drill guide extension spring for longitudinally extending the drill guide relative to the mandrel. In addition, the clamping device can include means for introducing lubricant through a lubricant supply port defined in the housing for delivery to the cutting element, thereby cooling and lubricating the cutting element.

One embodiment of the clamping device of the present invention also includes vacuum means, in communication with the internal bore of the mandrel, for vacuuming chip swarf created during drilling operations from the internal bore of the mandrel. The clamping device can also include chip swarf breaking means for breaking the chip swarf created during drilling operations into a plurality of smaller chip swarf portions. In one embodiment, the chip swarf breaking means includes fluid injection means for injecting fluid into the internal bore of the mandrel to create a plurality of smaller chip swarf portions from the chip swarf created during drilling operations.

The drill motor of the present invention can also include a pneumatically actuated motor and trigger means, responsive to actuation by an operator of the drill motor, for controlling the operation of the drill motor. In particular, the drill motor typically has a first active state in which the drill motor rotates the cutting element during drilling operations, and a second idle state in which the cutting element is rotationally stationary.

Upon actuation of the trigger means, fluid is preferably supplied, such as by fluid supply means, to the pneumatically actuated motor to initiate the first active state. Fluid is also preferably simultaneously introduced through a port defined in the housing and into the forward portion of the internal cavity so as to urge the piston rearwardly such that the mandrel is longitudinally retracted. Thus, the motor can be pneumatically actuated and the drill motor can be simultaneously clamped to the drill plate by actuation of the trigger means. The clamping device of one embodiment can include lubricant supply means, also responsive to actuation of the trigger means, for supplying lubricant to the cutting element during the first active state of the drill motor.

Further, the clamping device can include valve means, responsive to actuation of the trigger means, for halting the supply of fluid to the pneumatically actuated motor during the second idle state of the drill motor. In addition, the valve means preferably simultaneously directs fluid through a port defined in the housing and into the rearward portion of the internal cavity such that the piston is urged forwardly and the mandrel is longitudinally extended. Thus, the drill motor can be unclamped or released from the drill plate simultaneous with ceasing the supply of fluid to the pneumatically actuated motor.

Accordingly, the method and apparatus for clamping a drill motor to a drill plate according to this invention allows the end portion of the housing to be inserted and clamped within an aperture defined in a drill plate which has no internal sleeve or bushing and no lock screws. Thus, the clamping device of the present invention can clamp a drill motor to immediately adjacent apertures defined in a drill plate such that closely positioned holes can be drilled. In addition, incorporation of the piston within the housing allows the piston to extend and retract the mandrel in an efficient manner by placing direct axial forces on the mandrel such that the drill motor is not cantilevered. Consequently, the drill motor of the present invention can produce the relatively large amounts of thrust necessary to drill holes in relatively hard materials without requiring the operator to support or offset such large amounts of thrust. In addition, the drill motor of the present invention can repeatedly produce lesser amounts of thrusts without fatiguing the operator.

DETAILED DESCRIPTION OF THE PREFERRED EMBODIMENTS

Various methods and apparatus embodiments of the invention are set forth below. While the invention is described with reference to specific preferred methods and apparatus including those illustrated in the drawings, it will be understood that the invention is not intended to be so limited. To the contrary, the invention includes numerous alternatives, modifications and equivalents as will become apparent from consideration of the present specification including the drawings, the foregoing discussion, and the following detailed description.

Figures 1, 4, 5:
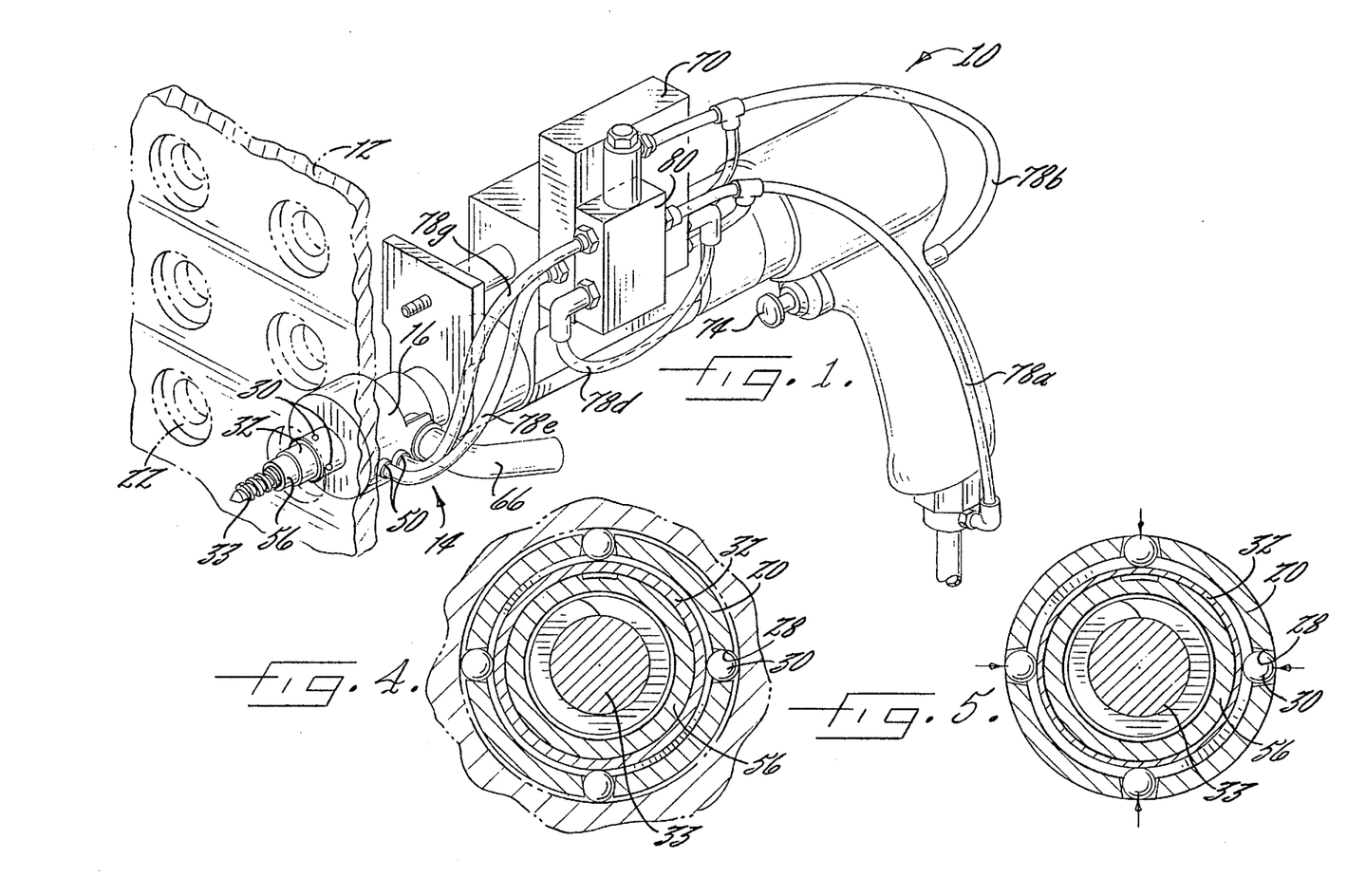
FIG. 1 is a perspective view of the drill motor and the associated clamping device according to an embodiment of the present invention which includes valve means and fluid injection means.
FIG. 4 is a lateral cross-sectional view of a clamping device according to one embodiment of the present invention illustrating the plurality of ball bearings which are received by respective ones of the plurality of recesses and which have been extended outwardly so as to contact the drill plate, thereby clamping the drill motor to the drill plate.
FIG. 5 is a lateral cross-sectional view of a clamping device according to one embodiment of the present invention illustrating the plurality of ball bearings which are received by respective ones of the plurality of recesses and which have not been extended outwardly, thereby permitting the drill motor to be mounted to or disconnected from the drill plate.

Referring now to FIG. 1, a drill motor 10 a drill plate 12 and a clamping device 14 of the present invention are illustrated. The clamping device includes a housing 16 which defines an internal cavity 18 opening through a first end portion 20 of the housing. The first end portion of the housing has a predetermined exterior shape which is adapted to be received and clamped within an aperture 22 defined in a drill plate. As shown, the first end portion and the aperture defined in the drill plate are generally cylindrical, however, the first end portion and the drill plate aperture can have other shapes without departing from the spirit and scope of the present invention.

Figure 2:
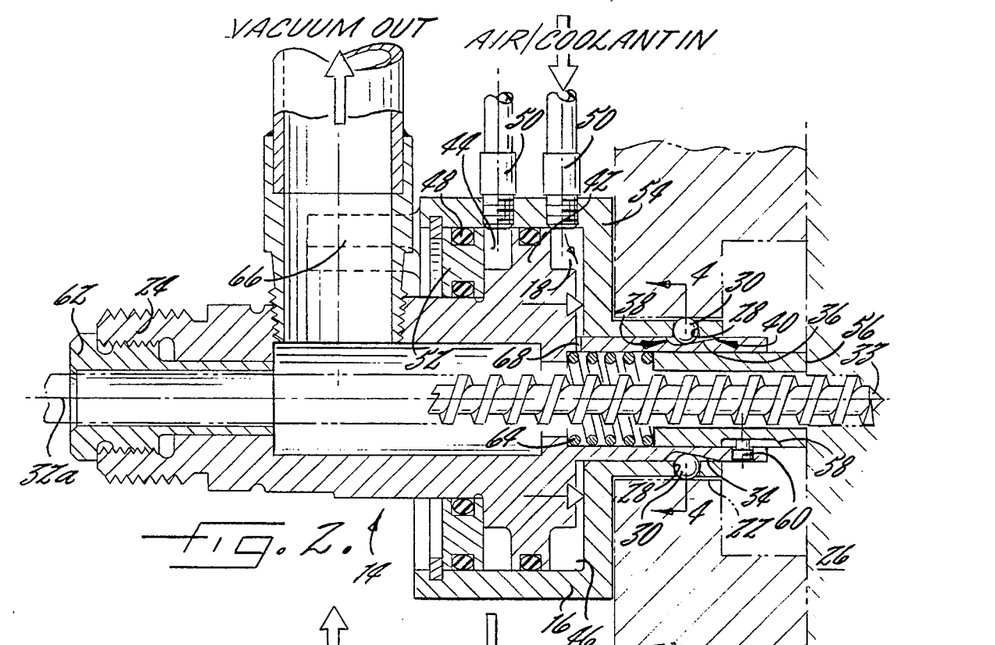
FIG. 2 is a longitudinal cross-sectional view of a clamping device of the embodiment of the present invention illustrated in FIG. 1 in which the mandrel is in a retracted position.
Figure 3:
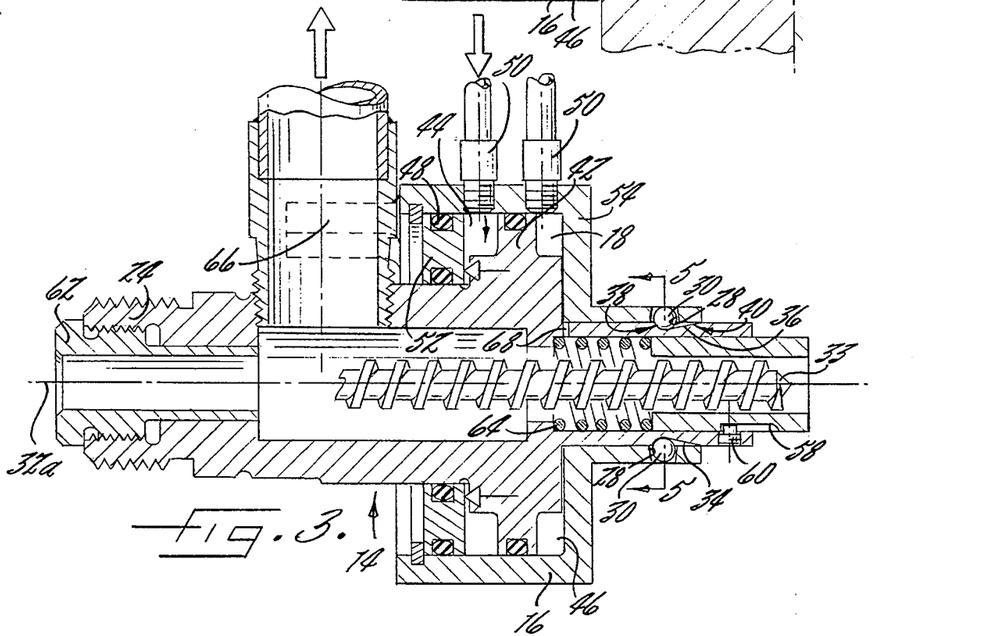
FIG. 3 is a longitudinal cross-sectional view of a clamping device according to the embodiment of the present invention illustrated in FIG. 1 in which the mandrel is in an extended position.

The housing 16 of the clamping device 14 is removably connected to the drill motor 10. Although any method of attaching the clamping device to the drill motor which is known to those skilled in the art can be employed, the rear portion of the clamping device can be threadably connected to the drill motor, such as by complimentary threaded fittings 24 on a rear portion of the housing and the drill motor as shown in FIGS. 2 and 3. Consequently, by clamping the housing to the drill plate as hereinafter described, the drill motor is also attached to the drill plate Thereafter, drilling operations can be commenced to drill a hole in the workpiece 26 underlying the drill plate. Since the drill plate is precisely aligned with the underlying workpiece, the resulting hole in the workpiece is also precisely positioned.

As shown in more detail in longitudinal cross-section in FIGS. 2 and 3 and in lateral cross-section in FIGS. 4 and 5, the first end portion 20 of the housing 16 also defines a plurality of openings The clamping device 14 also includes a plurality of ball bearings 30, typically spherical ball bearings, which are preferably disposed within respective ones of the plurality of openings. Typically, each ball bearing has a first predetermined diameter which is less than the second predetermined diameter of the openings such that the ball bearings are retained within the openings defined in the housing.

The clamping device 14 of the present invention also includes clamping means for forcing the ball bearings 30 outwardly within the respective openings 28 defined in the first end portion 20 of the housing 16 such that portions of the ball bearings extend outwardly beyond the housing. As illustrated in FIGS. 3 and 4, the outwardly extended ball bearings are urged against the drill plate 12 and, more particularly, are urged against the sidewall of the respective aperture 22 defined in the drill plate. Thus, the drill motor 10 is securely clamped to the drill plate.

As also illustrated in FIGS. 2–5, the clamping means preferably includes a mandrel 32 defining an internal bore through which the cutting element 33, such as the illustrated drill bit, can extend. The mandrel is typically annular in shape and is disposed, at least partially, within the internal cavity be of the housing 16. The mandrel preferably has an exterior surface in which a plurality of recesses 34 are defined. The recesses are generally spaced in equal angular increments about the circumference of the mandrel. For example, in the illustrated embodiment, four recesses are positioned at 90° angular increments about the circumference of the mandrel. Each recess is also preferably aligned with a respective opening 28 defined in the housing and is adapted to receive a respective ball bearing 30.

Each recess 34 generally includes an inclined surface 36 extending from a first end 38 outwardly to a second end 40. In addition, the clamping means preferably includes means for urging the ball bearings 30 outwardly along the respective inclined surfaces from the first end toward the second end. More specifically, the clamping means preferably includes means for moving the mandrel 32 relative to the housing 16 such that the ball bearings move outwardly along the respective inclined surfaces from the first end to the second end as explained in detail below.

In one embodiment, the mandrel 32 defines a central longitudinal axis 32a along which the cutting element 33 extends. The mandrel of this embodiment is also adapted for longitudinal movement relative to the housing 16. Correspondingly, each inclined surface 36 extends both longitudinally from the first end 38 to the second end 40 and radially outward from the first end to the second end. Thus, the means, of this embodiment, for moving the mandrel relative to the housing preferably includes retraction means for longitudinally retracting the mandrel within the housing such that a plurality of ball bearings move outwardly along a respective inclined surface from the first end toward the second end.

In particular, each ball bearing 30 is disposed and retained within a respective opening 28 defined in the housing 16. Thus, as the mandrel 32 of this embodiment longitudinally retracts within the housing as shown in FIG. 2, each ball bearing is held in a fixed longitudinal position by the housing and, consequently, moves upwardly along the respective inclined surface 36 of the mandrel from the first end 38 toward the second end 40.

In order to extend the ball bearings 30 outwardly upon retraction of the mandrel 32 of this embodiment relative to the housing 16, each inclined surface 36 is tapered so as to extend increasingly radially outward in a direction extending from the drill motor be toward the workpiece 26. In other embodiments of the present invention, however, the recesses 34 defined on the exterior surface of the mandrel and, more particularly, the inclined surfaces could be tapered in other directions to provide for the outward extension of the ball bearings in response to other predetermined movements of the mandrel relative to the housing. For example, the inclined surfaces could slope both longitudinally and radially inwardly in a direction extending from the drill motor to the workpiece such that ball bearings could be extended outwardly by the extension of the mandrel relative to the housing.

Alternatively, the inclined surfaces 36 could extend circumferentially, instead of longitudinally, about the mandrel 32. Thus, by rotating the mandrel in a predetermined direction relative to the housing 16, the ball bearings 30 of this embodiment would move outwardly along respective ones of the inclined surfaces from the first end 38 toward the second end 40 so as to be urged outwardly against the drill plate Accordingly, the longitudinal movement of the mandrel relative to the housing and the corresponding longitudinal and radially outward progression of the ball bearings relative to respective ones of the inclined surfaces are illustrated and described herein for exemplary purposes and other specific embodiments can be employed without departing from the spirit and scope of the present invention.

In the embodiment illustrated in FIGS. 2 and 3, the retraction means includes a piston 42 disposed in the housing 16 and dividing the internal cavity 18 of the housing into a rearward portion 44 and a forward portion 46. As shown, the piston can be an annular piston through which the cutting element 33 extends. In addition, the piston can include a seal 48, such as an O-ring, separating the forward and rearward portions of the internal cavity. The piston cooperatively engages the mandrel 32 and is adapted for longitudinal movement therewith. More specifically, in the illustrated embodiment, the piston and the mandrel are integrally formed. However, the mandrel and the piston can be separate components which are joined for cooperative movement.

As further illustrated in FIGS. 2 and 3, the housing 16 of this embodiment preferably defines at least one port 50 extending therethrough. Preferably, at least one port of the housing is in fluid communication with the forward portion 46 of the internal cavity 18 and at least one port is in fluid communication with the rearward portion 44 of the internal cavity. In this embodiment, the retraction means also includes fluid supply means, such as a pump, for introducing fluid, such as air, through the port which is in fluid communication with the forward portion of the internal cavity such that the piston 42 is urged rearwardly within the internal cavity of the housing. Consequently, the mandrel 32 is longitudinally retracted relative to the housing. Typically, the piston moves rearwardly until the resistance of the ball bearings 30 to further outward extension, due to the inward force exerted by the sidewalls of the aperture 22 on the ball bearings, offsets the force generated by the rearward urged piston, or until the piston contacts the rear surface 52 of the housing. Thus, depending upon the size of the ball bearings, the size of the openings 28 defined in the housing 16 and the length and angle of the respective inclined surfaces 36, the ball bearings may be extended outwardly further than allowed by the corresponding aperture. Consequently, as the diameter of an aperture enlarges with use and wear, the clamping device 14 of the present invention is able to securely clamp to the larger aperture without structural modification.

Once the clamping device 14 and the drill motor 10 have been securely attached or clamped to the drill plate 12, drilling operations can commence to produce a precisely positioned hole in the workpiece 26. Following completion of the drilling operations, the clamping device is generally released from the drill plate such that the drill motor can be removed therefrom. Accordingly, the clamping device preferably includes releasing means for retraction of the ball bearings 30 to a position such as that shown in FIG. 5 so that the ball bearings are no longer urged against the sidewalls of the aperture 22 defined in the drill plate. In the embodiment illustrated in FIG. 3, the releasing means includes means for longitudinally extending the mandrel 32 relative to and within the housing 16. By longitudinally extending the mandrel, the plurality of ball bearings move inwardly along the respective inclined surface 36 from the second end 40 toward the first end 38. Accordingly, the drill motor is released from the drill plate. As described above, however, the direction in which the inclined surfaces taper can be readily varied such that the plurality of ball bearings will move inwardly in response to other predetermined movements of the mandrel relative to the housing.

In the illustrated embodiment, the housing 16 also includes at least one port 50 extending therethrough which is in communication with a rearward portion 44 of the internal cavity 18. Thus, by introducing fluid, such as air, through the port and into the rearward portion of the internal cavity, such as with the fluid supply means, the piston 42 is urged forwardly within the internal cavity of the housing and the mandrel is longitudinally extended. Typically, the piston moves forwardly until a front surface of the piston contacts the front wall 54 of the housing.

The clamping device 14 of the present invention can also include a front drill guide 56 disposed within and slidably connected to the mandrel 32. In the illustrated embodiment, the front drill guide includes a longitudinal slot 58 in which a set screw 60 which extends through the mandrel 32 is received. Thus, the mandrel and the front drill guide can be adapted for relative motion therebetween. The clamping device can also include a rear drill guide 62 for further supporting and guiding the cutting element 33. As shown, the rear drill guide is removably connected to the housing 16, such as by a threadable connection.

The drill guides 56 and 62 define a longitudinally extending bore through which the cutting element 33 extends. Preferably, the length of the front drill guide is about 2.25 to about 2.75 times the diameter of the cutting element, however, the length of the drill guides can be readily varied as known to those skilled in the art. The longitudinal bore extending through the mandrel 32 and piston 42 of the illustrated embodiment preferably has a diameter greater than the diameter of the largest cutting element which the clamping device is adapted to receive. Thus, the clamping device 14 of the present invention can readily accommodate cutting elements of various sizes simply by replacing the front and rear drill guides with drill guides which are sized to accommodate the cutting element.

The clamping device 14 can also include a drill guide extension spring 64. The drill guide extension spring longitudinally extends the front drill guide 56 relative to the mandrel 32. Thus, the front surface of the front drill guide can be urged against the surface of the workpiece 26. The front drill guide is retained within the mandrel, however, by the connection of the front drill guide to the mandrel, such as with the set screw 60, for example.

The clamping device 14 can also include a vacuum collection feature including vacuum means, such as a vacuum pump (not shown), for example, which is in fluid communications with the internal bore of the mandrel 32, for vacuuming chip swarf created during drilling operations from the internal bore of the mandrel. In order to efficiently vacuum chip swarf created during drilling operations, the drill guide extension spring 64 preferably urges the front surface of the front drill guide 56 against the surface of the workpiece 26. Accordingly, chip swarf created during drilling operations will be drawn through the flutes of the cutting element 33, such as the illustrated drill bit, to a vacuum port 66 defined in the housing 16 for external collection.

The clamping device 14 of the present invention can also include chip swarf breaking means for breaking the chip swarf created during drilling operations into a plurality of chip swarf portions having smaller dimensions than the originally created chip swarf. In particular, the mandrel 32 of the illustrated embodiment of the present invention includes a fluid injection port 68 extending therethrough. According to this embodiment, the chip swarf breaking means includes fluid injection means for injecting fluid, such as air, into the internal bore of the mandrel to break the chip swarf created during drilling operations into a plurality of smaller chip swarf portions. As illustrated in FIGS. 2 and 3, a portion of the fluid introduced into the forward portion 46 of the housing 16 can be bled through the fluid injection port to the internal bore of the mandrel so as to break the chip swarf into a plurality of smaller chip swarf portions.

A portion of the fluid which is injected into the forward portion 46 of the housing 16 in order to retract the mandrel 32 can also be bled between the mandrel and the first end portion 20 of the housing and, more particularly, can also be bled about the ball bearings 30. In addition, the fluid is allowed to leak between the mandrel and the front drill guide 56. The amount of fluid which is bled from the forward portion of the housing is small enough that the clamp-up force of the clamping device 14 is not decreased, however, by allowing fluid, such as air, to bleed between these components, chip swarf and other undesirable matter is prevented from lodging within or between these components. Accordingly, clogging due to chip swarf accumulation is prevented and smooth movement between the mandrel, the end portion of the housing and the drill guide is maintained during drilling operations.

As illustrated in FIG. 1, the drill motor 10 includes a pneumatically actuated motor 72. For example, suitable pneumatically actuated motors are distributed by Cooper Industries of Lexington, S.C. and by Deutsch American Pneumatic Tool of Gardena, Calif. The drill motor also preferably includes trigger means 74, such as a trigger or a switch, responsive to actuation by an operator of the drill motor, for controlling the operation of the drill motor. In particular, the drill motor generally has two states, namely, a first active state in which the drill motor rotates the cutting element 33 during drilling operations, and a second idle state in which the cutting element is rotationally stationary.

Figure 6:
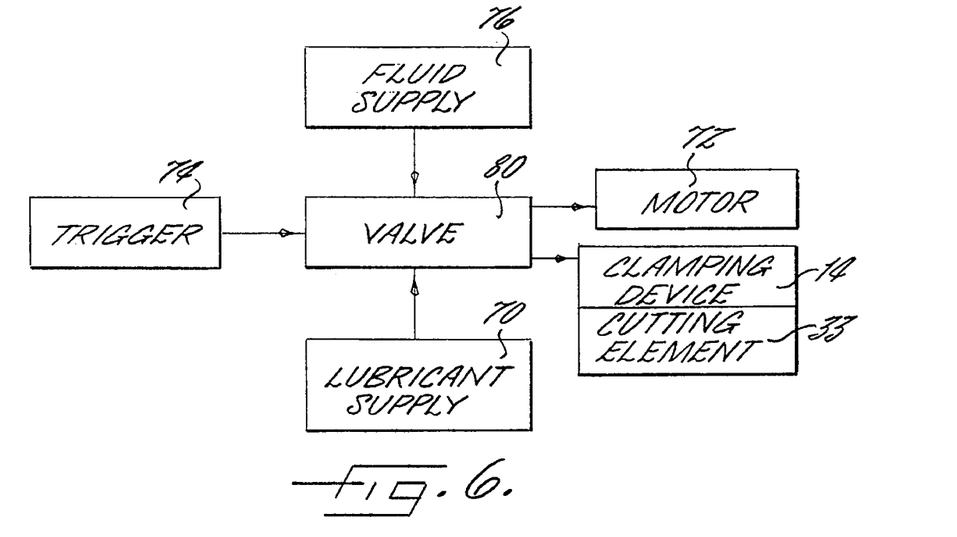
FIG. 6 is a block diagram illustrating the relationship of the valve means with other components of the drill motor and the associated clamping device of one embodiment of the present invention.

As illustrated in block diagram form in FIG. 6, the fluid supply means 76 supplies fluid to the pneumatically actuated motor 72 upon actuation of the trigger 74 and during the first active state of the drill motor 10. As explained in more detail hereinafter, fluid is also simultaneously introduced through a port 50 defined in the housing and into the forward portion 46 of the internal cavity 18 such that the piston 42 is urged rearwardly within the internal cavity of the housing. Thus, the mandrel 32 is longitudinally retracted within the housing and the drill motor is secured or clamped to the drill plate 12 simultaneous with the commencement of drilling operations. Thus, the operator can clamp the drill motor to the drill plate and simultaneously begin drilling operations simply by actuating the trigger or switch of the drill motor.

Likewise, the drill motor 10 of one embodiment of the present invention preferably includes valve means 80, responsive to the actuation of the trigger 74, for controlling the supply of fluid to the pneumatically actuated motor 72 and to one port 50 defined in the housing 16 and into the forward portion 46 of the internal cavity 18, as described below. In particular, the valve means is adapted to halt the supply of fluid to the pneumatically actuated motor during the second idle state of the drill motor. For example, the valve means can be a four-way valve, such as a Clippard Four-Way Valve with an Airpilot Actuator. In addition, as illustrated in FIGS. 1, 7, 8 and 10, the four-way valve can receive fluid input, via tubes 78a and 78b, from the fluid supply means 76 and from an internal cavity within the drill motor immediately upstream of the motor, respectively. By tapping into the supply of fluid immediately upstream of the motor, fluid is only supplied via tube 78b in instances in which the trigger has been actuated and, consequently, is not supplied in instances in which the trigger has not been actuated.

In addition, once the trigger or switch 74 is released, the valve means 80 preferably halts the supply of fluid to the pneumatically actuated motor 72 such that the drilling operations cease. Fluid is also preferably simultaneously introduced through a port 50 defined in the housing 16, via tube 78g, and into the rearward portion 44 of the internal cavity 18 such that the piston 42 is urged forwardly within the internal cavity of the housing and the mandrel 32 is longitudinally extended therein. The valve means also preferably ceases the supply of fluid to the forward portion 46 of the internal cavity of the housing upon release of the trigger and simultaneous with the introduction of fluid in the rearward portion such that the mandrel can be more readily extended. Thus, upon completion of drilling operations, the supply of fluid to the pneumatically actuated motor and the release or unclamping of the drill motor 10 from the drill plate 12 is preferably simultaneously effected.

Figure 7:
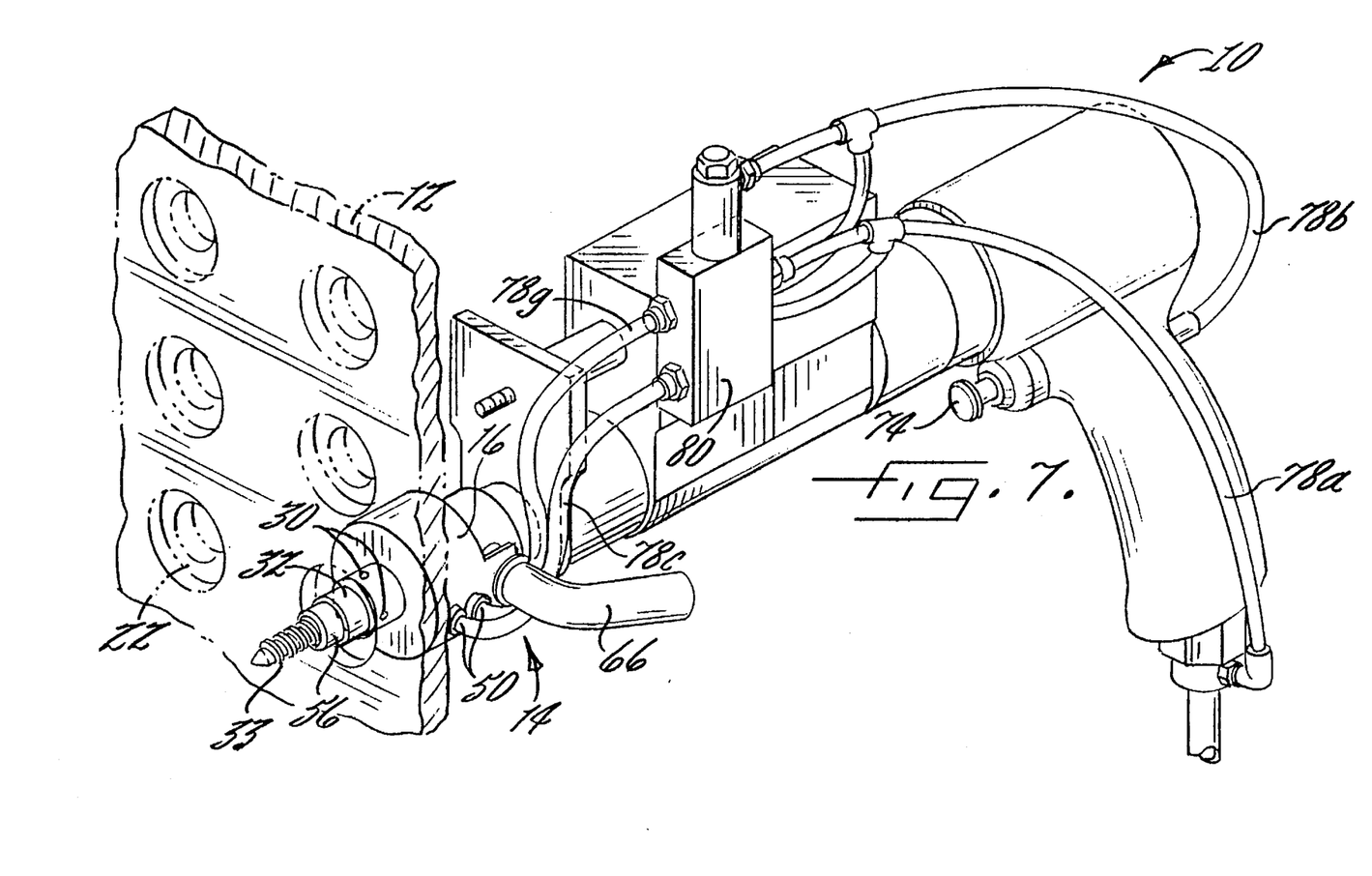
FIG. 7 is a perspective view of the drill motor and the associated clamping device according to an embodiment of the present invention which includes valve means and the vacuum collection feature, but which does not include the coolant delivery feature.

For certain applications, such as the drilling of relatively cuttable, dust generating materials, i.e., carbon epoxy and aluminum, the drill motor 10 need not include a coolant delivery feature as described below, but does preferably include a vacuum collection feature, including a vacuum port 66 to remove the chip swarf and dust generated during the drilling operations. In addition, the motor 72 of this embodiment typically operates at a standard speed, such as 2000 to 3000 rpm. As illustrated in FIG. 7, the drill motor of this embodiment also preferably includes valve means 80 for controlling fluid delivery to the drill motor. In particular, upon actuation of the trigger 74 of this embodiment, fluid is delivered, via tube 78b, to the valve means which, in turn, delivers fluid, through tube 78c, directly to the port 50 in communication with the forward portion of the internal cavity 18 of the housing 16 such that the mandrel 32 is retracted and the clamping device 14 is secured to the drill plate 12.

According to one embodiment of the present invention, the drill motor 10 can include a coolant delivery feature. Accordingly, the housing 16 of this embodiment can include a lubricant supply port. As shown in FIG. 1, the clamping device 14 can also include means 70, such as a Uni-mist Coolant Applicator, for introducing lubricant, such as a coolant mist, through the lubricant supply port for delivery to the cutting element 33. As shown, the lubricant supply port can be the same port 50 which is defined in the housing and through which fluid is introduced into the forward portion 46 of the internal cavity 18. As explained above in conjunction with the chip swarf breaking means, the lubricant preferably flows through the fluid injection port 68 defined in the mandrel 32 to lubricate the cutting element as well as the ball bearings 30 and the interface between the mandrel and the front drill guide 56 through which coolant carrying fluid leaks. Accordingly, frictional forces between the rotating cutting element, the front drill guide and the chip swarf produced during drilling operations, as well as the heat generated thereby, can be reduced.

The lubricant supply means 70 of the clamping device 14 of the present invention can also be responsive to the valve means 80 which, in turn, is responsive to the actuation of the trigger 74. Thus, the lubricant supply means preferably supplies lubricant automatically, to the cutting element 33 during the first active state of the drill motor 10. Preferably, the supply of lubricant to the cutting element during the first active state of the drill motor commences simultaneously with the retraction of the mandrel 32 and the supply of fluid to the pneumatically actuated motor 72. Likewise, the valve means preferably ceases the supply of lubricant upon the release of the trigger and simultaneous with the ceasing the supply of fluid to the pneumatically actuated motor.

In the embodiment illustrated in FIG. 1, the drill motor 10 includes lubricant supply means 70, valve means 80 and a vacuum port 66. Upon actuation of the trigger 74, the valve means supplies fluid through tube 78d to the lubricant supply means which injects a coolant, typically as a mist, into the fluid and delivers the coolant carrying fluid through tube 78e to the port 50 in communication with the forward portion 46 of the internal cavity 18 such that the piston 42 and the mandrel 32 are urged rearwardly and the drill motor is locked to the drill plate 12. Due to the delivery of the coolant carrying fluid to the forward portion of the internal cavity, the coolant can, in turn, be delivered to the internal components of the clamping device 14 and to the surface of the workpiece 26.

As illustrated in FIG. 1, chip swarf generated during operation of the drill motor 10 can be collected by the vacuum means through vacuum port 66. However, in other embodiments, the drill motor can be operated and coolant can be delivered to the surface of the workpiece 26 without employing the vacuum collection feature. For example, a drill motor designed to drill relatively hard materials which do not generate significant amounts of dust, such as stacked layers of titanium or stacked layers of titanium and aluminum, at relatively standard operating speeds, such as 500 rpm, need not include the vacuum collection feature.

As illustrated in FIG. 1, however, a drill motor 10 of the present invention can include both coolant delivery and vacuum collection features. For example, a drill motor typically includes both vacuum collection and coolant delivery features, as shown FIG. 1, in instances in which the workpiece includes a combination of a dust generating material, such as carbon epoxy, and a relatively hard material, such as titanium. In these embodiments, the drill motor generally operates at a relatively standard speed, such as 500 rpm. A drill motor may also include the vacuum collection and coolant delivery features during relatively high speed drilling operations, such as drill motors operating at, for example, 20,000 rpm and which are drilling relatively cuttable materials, such as carbon epoxy or aluminum.

Figure 8:
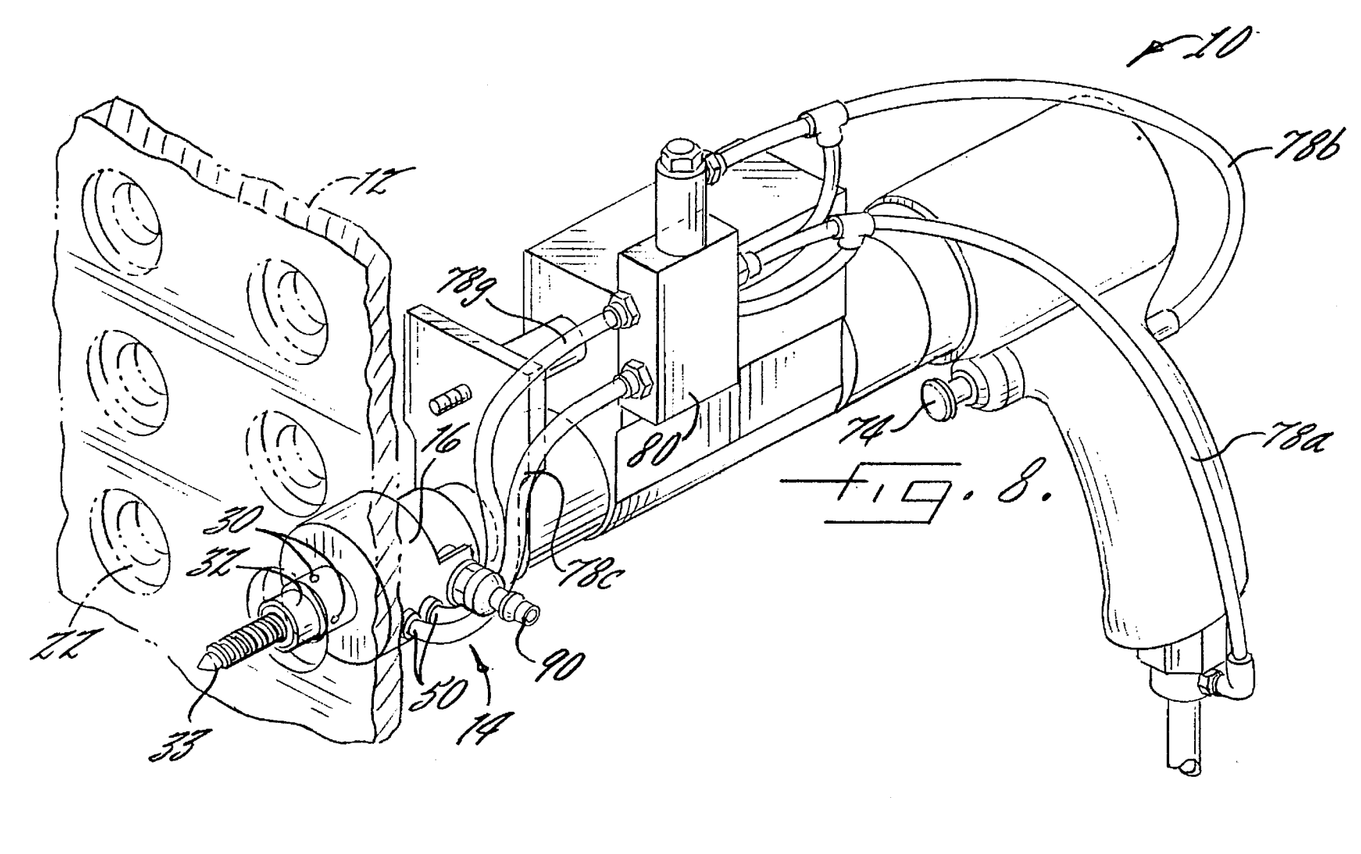
FIG. 8 is a perspective view of the drill motor and the associated clamping device according to an embodiment of the present invention which includes valve means and a quick disconnect fitting for providing increased coolant delivery, but which does not include the vacuum collection feature.
Figure 9:
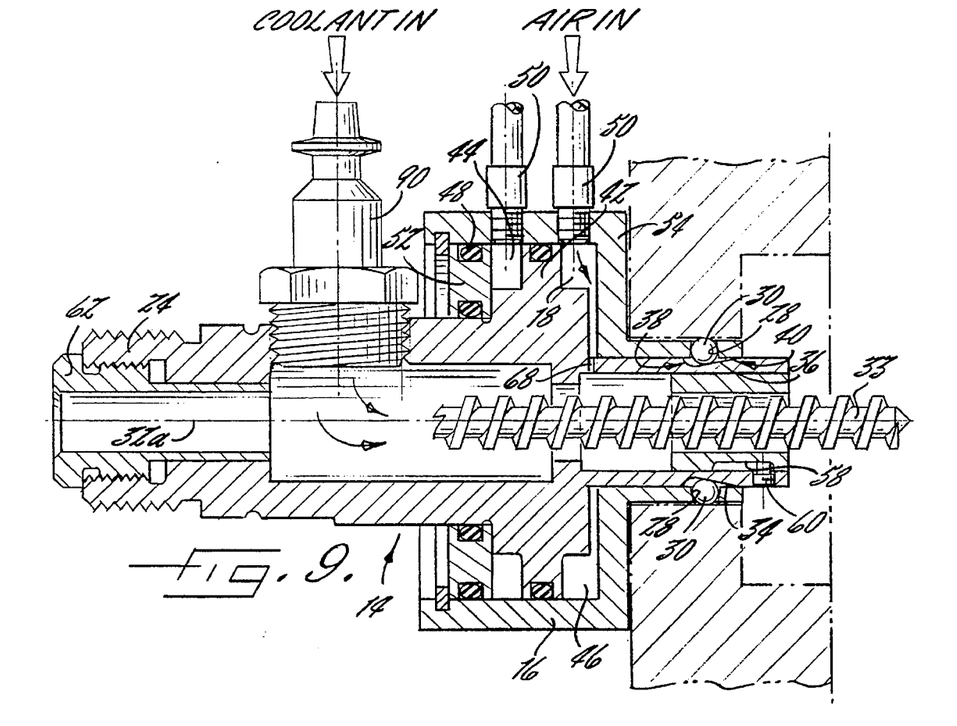
FIG. 9 is a longitudinal cross-sectional view of a clamping device of the embodiment of the present invention illustrated in FIG. 8 in which the mandrel is in a retracted position.

As also illustrated in FIGS. 8 and 9, the drill motor 10 can include means for directly injecting coolant into the interior cavity 18 of the housing 16. In particular, a fitting 90, such as a quick disconnect fitting distributed by Foster Manufacturing Company, Inc. of Springfield, Mo., can be mounted to the housing so as to be in fluid communication the bore defined by the mandrel 32 and the piston 42. Thus, a relatively large quantity of coolant, typically delivered as a coolant mist in a carrier fluid, such as air, can be injected via the quick disconnect fitting at relatively high pressures from an external coolant supply (not illustrated). By employing a coolant injection means which is separate from the fluid supply means 76, fluid is not bled from the fluid supply of the drill motor such that operation of the drill pneumatically actuated motor is not impaired.

As also illustrated in FIGS. 8 and 9, a clamping device 14 need not include a drill guide extension spring 64 since the drill motor 10 does not include a vacuum collection feature. Instead, the front drill bushing 56 can be fixed in position relative to the mandrel 32, such as by urging the set screw 60 against the outer surface of the front drill bushing. Preferably, the drill bushing is fixed in position such that the end portions of the mandrel and the drill bushing are aligned as illustrated in FIG. 8. By way of example, the embodiment of the drill motor illustrated in FIGS. 8 and 9 can be employed during the drilling of relatively hard materials, such as titanium or a combination of titanium and aluminum at relatively standard operating speeds, such as 500 rpm.

Figure 10:
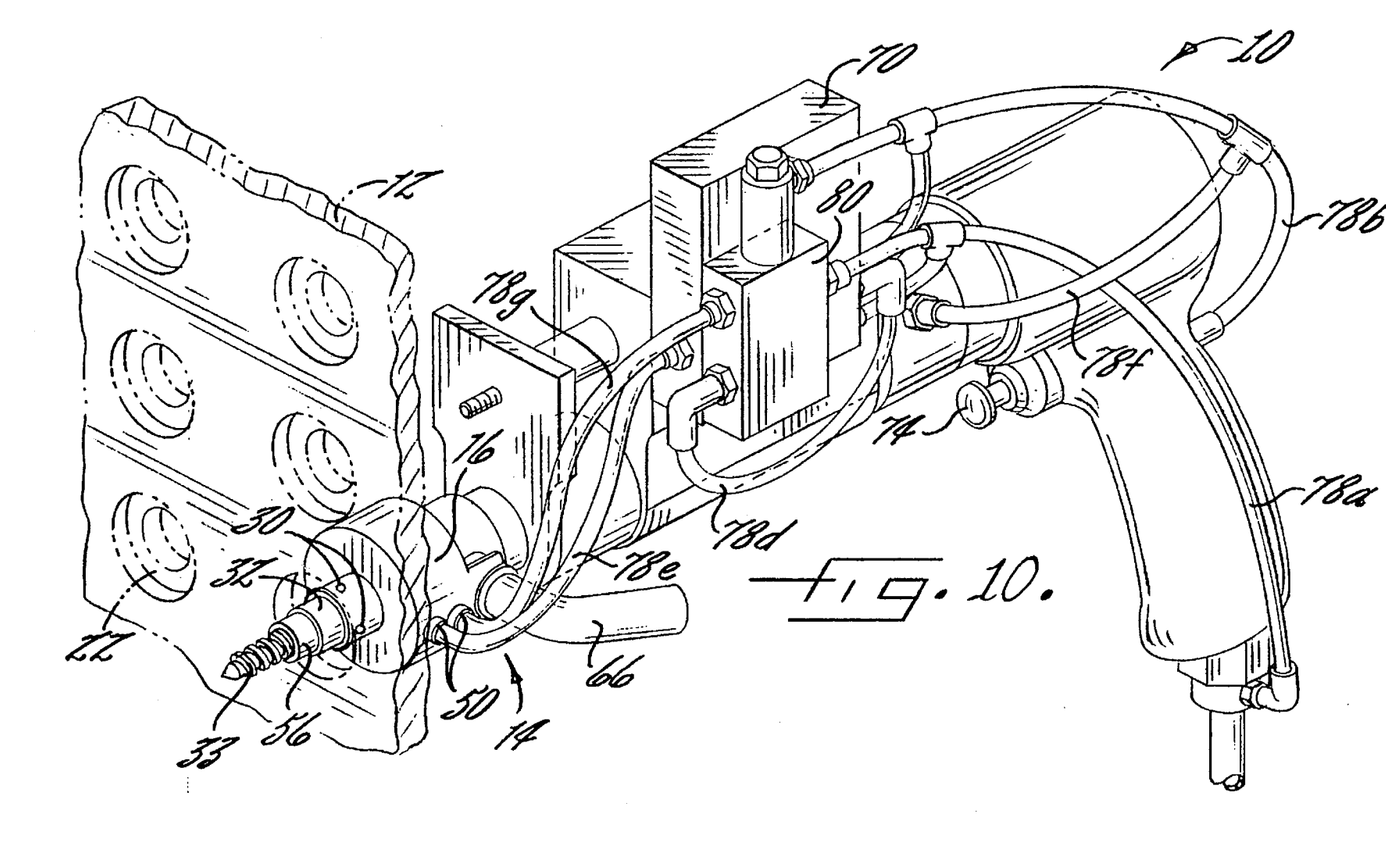
FIG. 10 is a perspective view of the drill motor and the associated clamping device according to an embodiment of the present invention which includes valve means and the coolant delivery and vacuum collection features and which provides an air blast to the workpiece.

Further, an embodiment of the drill motor 10 of the present invention is illustrated in FIG. 10 in which an increased amount of fluid, typically termed an air blast, is provided through the bore of the mandrel 32 and the piston 42 to the surface of the workpiece 26. An air blast is typically provided during the drilling of materials which are extremely sensitive to heat or chip erosion. For example, an air blast may be provided during the drilling of a carbon epoxy layer which overlies a seal groove formed in an aluminum substructure and which has been filled with a channel sealant. As known to those skilled in the art, the channel sealant is relatively sensitive to heat and chip erosion. Consequently, by providing an air blast, the erosion of the chip sealant during the drilling operations is minimized. In addition, the speed with which the drill motor 10 operates is preferably relatively high, such as 20,000 rpm, to further facilitate the drilling of such sensitive materials.

The blast of fluid can be provided to the bore defined by the mandrel 32 and the piston 42 in a variety of manners without departing from the spirit and scope of the present invention. For example, as illustrated in FIG. 10, a port can be defined through the housing 16 of the drill motor 10 so as to be in fluid communication with a portion of the drill motor which houses a "dummy" planetary gear. A port can also be formed between the portion of the drill motor which houses the "dummy" planetary gear and an interior portion of the collet chuck, such as an Erickson 200 Series collet chuck which, in turn, is in fluid communication with the bore of the piston 42 and the mandrel 32. Thus, as shown in FIG. 10, fluid is provided, via tube 78f, to the port defined in the housing of the drill motor, through the port defined to the interior of the collet chuck and through the bore defined by the mandrel and the piston for delivery to the workpiece 26. As shown, the fluid supplied via tube 78f is obtained from an internal portion of the drill motor immediately upstream of the motor 72 so as to only be provided while the trigger 74 is actuated. In addition, the drill motor of this embodiment preferably includes vacuum means, such as via vacuum port 66, for removing the chips swarf from the workpiece surface, to further prevent chip erosion.

As described above, the drill motor 10 and clamping device 14 of the present invention can be readily adapted to a variety of applications depending upon the particular combination of features selected. These applications include the drilling of different types and combinations of materials at one or more drill speeds. Thus, the drill motor and clamping device of the present invention provides a modular drilling system which increases the flexibility with which an operator can machine or drill various workpieces.

Accordingly, the method and apparatus for clamping a drill motor 10 to a drill plate 12 according to this invention allows the first end portion 20 of a housing 16 to be inserted and clamped within an aperture 22 defined in a drill plate which has no internal sleeve or bushing and no lock screws. Thus, the clamping device 14 of the present invention can clamp a drill motor to immediately adjacent apertures defined in a drill plate such that closely positioned holes can be drilled. In addition, incorporation of the piston 42 within the housing allows the piston to efficiently retract and extend the mandrel 32, thereby clamping and releasing the drill motor to the drill plate, by placing direct axial forces on the mandrel such that the drill motor is not cantilevered. Consequently, the drill motor of the present invention can produce the relatively large amounts of thrust necessary for drill holes in relatively harden materials without requiring the operator to support such large amounts of thrust.

In the drawings and the specification, there has been set forth a preferred embodiment of the invention and, although specific terms are employed, the terms are used in a generic and descriptive sense only and not for purpose of limitation, the scope of the invention being set forth in the following claims.

That which is claimed is:

1. A device for clamping a drill motor to a drill plate and for receiving a cutting element, the clamping device comprising:

a plurality of ball bearings having a first predetermined diameter;

a housing, removably connected to the drill motor, which defines an internal cavity opening through a first end portion of said housing, the first end portion of said housing having a predetermined exterior shape adapted to be received within an aperture defined in the drill plate, the first end portion of said housing also defining a plurality of openings having a second predetermined diameter less than the first predetermined diameter of said ball bearings; and clamping means for forcing each ball bearing outwardly within a respective opening defined in the first end portion of said housing such that portions of said ball bearings extend outwardly beyond said housing and are urged against the drill plate such that the drill motor is clamped thereto.

2. A clamping device according to claim 1 wherein said clamping means comprises a mandrel defining an internal bore through which the cutting element can extend, said mandrel having an exterior surface in which a plurality of recesses are defined, wherein each recess is aligned with a respective opening defined in said housing, and wherein each recess is adapted to receive a respective ball bearing.

3. A clamping device according to claim 2 wherein each recess defined in said mandrel includes an inclined surface extending from a first end outwardly to a second end, said clamping means further comprising means for urging the respective ball bearing outwardly along the inclined surface from the first end toward the second end.

4. A clamping device according to claim 3 wherein said means for outwardly urging the respective ball bearing includes means for moving said mandrel relative to said housing such that the respective ball bearing moves outwardly along the inclined surface from the first end toward the second end while at least a portion of the ball bearing is retained within the respective opening defined in said housing so as to thereby extend a portion of the respective ball bearing outwardly beyond said housing.

5. A clamping device according to claim 4 wherein said mandrel defines a longitudinal axis therethrough, and wherein each inclined surface extends both longitudinally and radially outward from the first end to the second end.

6. A clamping device according to claim 5 wherein said means for moving said mandrel relative to said housing includes retraction means for longitudinally retracting said mandrel within said housing such that said plurality of ball bearings move outwardly along a respective inclined surface from the first end toward the second end.

7. A clamping device according to claim 6 wherein said housing defines at least one port extending therethrough, and wherein said retraction means comprises:

a piston disposed within said housing and dividing the internal cavity of said housing into a rearward portion and a forward portion, wherein said piston cooperatively engages said mandrel and is adapted for longitudinal movement therewith, and wherein at least one port of said housing is in fluid communication with the forward portion of the internal cavity; and fluid supply means for introducing fluid through said at least one port of said housing and into the forward portion of the internal cavity such that said piston is urged rearwardly within the internal cavity of said housing and said mandrel is longitudinally retracted within said housing.

8. A clamping device according to claim 5 further comprising releasing means for longitudinally extending said mandrel within said housing such that said plurality of ball bearings move inwardly along a respective inclined surface from the second end toward the first end, thereby releasing the drill motor from the drill plate.

9. A clamping device according to claim 8 wherein said housing defines at least one port extending therethrough, and wherein said releasing means comprises:

a piston disposed within said housing and dividing the internal cavity of said housing into a rearward portion and a forward portion, wherein said piston cooperatively engages said mandrel and is adapted for longitudinal movement therewith, and wherein at least one port of said housing is in fluid communication with the rearward portion of the internal cavity; and fluid supply means for introducing fluid through said at least one port of said housing and into the rearward portion of the internal cavity such that said piston is urged forwardly within the internal cavity of said housing and said mandrel is longitudinally extended within said housing.

10. A clamping device according to claim 2 further comprising a drill guide disposed within and slidably connected to said mandrel, said drill guide defining a longitudinally extending bore through which the cutting element extends.

11. A clamping device according to claim 10 further comprising a drill guide extension spring for longitudinally extending said drill guide relative to said mandrel.

12. A clamping device according to claim 1 wherein said housing defines a lubricant supply port, and wherein the clamping device further comprises means for introducing lubricant through said lubricant supply port for delivery to the cutting element.

13. A clamping device according to claim 2 further comprises vacuum means, in fluid communication with the internal bore of said mandrel, for vacuuming chip swarf created during drilling operations from the internal bore of said mandrel.

14. A clamping device according to claim 13 further comprising chip swarf breaking means for breaking the chip swarf created during drilling operations into a plurality of chip swarf portions having smaller dimensions.

15. A clamping device according to claim 14 wherein said mandrel defines a fluid injection port extending therethrough, and wherein said chip swarf breaking means comprises fluid injection means for injecting fluid into the internal bore of said mandrel to break the chip swarf created during drilling operations into a plurality of smaller chip swarf portions.

16. A combination of a drill motor and a device for clamping the drill motor to a drill plate and for receiving a cutting element, the clamping device comprising:

a plurality of ball bearings;

a housing, removably connected to the drill motor, which defines an internal cavity opening through a first end portion of said housing, the first end portion of said housing having a predetermined exterior shape adapted to be received within an aperture defined in the drill plate, the first end portion of said housing also defining a plurality of openings in which said ball bearings are disposed; and clamping means for forcing each ball bearing outwardly within a respective opening defined in the first end portion of said housing such that portions of said ball bearings extend outwardly beyond said housing and are urged against the drill plate such that the drill motor is clamped thereto.

17. A combination of a drill motor and a clamping device according to claim 16 wherein said clamping means comprises a mandrel defining an internal bore through which the cutting element can extend, said mandrel having an exterior surface in which a plurality of recesses are defined, wherein each recess is aligned with a respective opening defined in said housing, and wherein each recess is adapted to receive a respective ball bearing.

18. A combination of a drill motor and a clamping device according to claim 17 wherein each recess defined in said mandrel includes an inclined surface extending from a first end outwardly to a second end, said clamping means further comprising means for urging the respective ball bearing outwardly along the inclined surface from the first end toward the second end.

19. A combination of a drill motor and a clamping device according to claim 18 wherein said means for outwardly urging the respective ball bearing includes means for moving said mandrel relative to said housing such that the respective ball bearing moves outwardly along the inclined surface from the first end toward the second end while at least a portion of the ball bearing is retained within the respective opening defined in said housing so as to thereby extend a portion of the respective ball bearing outwardly beyond said housing.

20. A combination of a drill motor and a clamping device according to claim 19 wherein said mandrel defines a longitudinal axis therethrough, wherein each inclined surface extends both longitudinally and radially outward from the first end to the second end, and wherein said means for moving said mandrel relative to said housing includes retraction means for longitudinally retracting said mandrel within said housing such that said plurality of ball bearings move outwardly along a respective inclined surface from the first end toward the second end.

21. A combination of a drill motor and a clamping device according to claim 20 wherein said housing defines at least one port extending therethrough, and wherein said retraction means comprises a piston disposed within said housing and dividing the internal cavity of said housing into a rearward portion and a forward portion, wherein said piston cooperatively engages said mandrel and is adapted for longitudinal movement therewith, and wherein at least one port of said housing is in fluid communication with the forward portion of the internal cavity.

22. A combination of a drill motor and a clamping device according to claim 21 wherein the drill motor comprises:

a pneumatically actuated motor; and trigger means, responsive to actuation by an operator of the drill motor, for controlling the operation of the drill motor, the drill motor having a first active state in which the drill motor rotates the cutting element during drilling operations, and a second idle state in which the cutting element is rotationally stationary.

23. A combination of a drill motor and a clamping device according to claim 22 further comprising fluid supply means, responsive to actuation of said trigger means, for supplying fluid to said pneumatically actuated motor during the first active state of the drill motor, and for simultaneously introducing fluid through said at least one port of said housing and into the forward portion of the internal cavity such that said piston is urged rearwardly within the internal cavity of said housing and said mandrel is longitudinally retracted within said housing.

24. A combination of a drill motor and a clamping device according to claim 23 wherein the clamping device further comprises lubricant supply means, responsive to actuation of said trigger means, for supplying lubricant to the cutting element during the first active state of the drill motor.

25. A combination of a drill motor and a clamping device according to claim 23 wherein the clamping device further comprises releasing means for longitudinally extending said mandrel within said housing such that said plurality of ball bearings move inwardly along a respective inclined surface from the second end toward the first end, thereby releasing the drill motor from the drill plate.

26. A combination of a drill motor and a clamping device according to claim 25 wherein at least one port of said housing is in fluid communication with the forward portion of the internal cavity, and wherein the drill motor further includes valve means, responsive to actuation of said trigger means, for halting the supply of fluid to said pneumatically actuated motor during the second idle state of the drill motor, and for simultaneously introducing fluid through said at least one port of said housing and into the rearward portion of the internal cavity such that said piston is urged forwardly within the internal cavity of said housing and said mandrel is longitudinally extended within said housing.

27. A method for clamping a drill motor to a drill plate with a clamping device having a plurality of ball bearings, and a housing, removably connected to the drill motor, which defines an internal cavity opening through a first end portion of the housing, the first end portion of the housing having a predetermined exterior shape adapted to be received within an aperture defined in the drill plate, the first end portion of the housing also defining a plurality of openings in which the ball bearings are disposed, the method comprising the steps of:

inserting the first end portion of the housing within an aperture defined in the drill plate; and forcing each ball bearing outwardly within a respective opening defined in the first end portion of the housing such that portions of the ball bearings extend outwardly beyond the housing and are urged against the drill plate such that the drill motor is clamped thereto.

28. A method according to claim 27 wherein the clamping device further includes a mandrel defining an internal bore through which a cutting element can extend, the mandrel having an exterior surface in which a plurality of recesses are defined, wherein each recess is aligned with a respective opening defined in the housing and is adapted to receive a respective ball bearing, and wherein each recess includes an inclined surface extending from a first end outwardly to a second end, wherein said step of forcing each ball bearing outwardly includes the step of urging each ball bearing outwardly along a respective inclined surface from the first end toward the second end.

29. A method according to claim 28 wherein said step of urging each ball bearing outwardly includes the step of moving the mandrel relative to the housing such that each ball bearing moves outwardly along the respective inclined surface from the first end toward the second end while at least a portion of the ball bearing is retained within the respective opening defined in the housing so as to thereby extend a portion of each ball bearing outwardly beyond the housing.

30. A method according to claim 29 wherein the mandrel defines a longitudinal axis therethrough, wherein each inclined surface extends both longitudinally and radially outward from the first end to the second end, and wherein said step of moving the mandrel relative to the housing includes the step of longitudinally retracting the mandrel within the housing such that the plurality of ball bearings move outwardly along a respective inclined surface from the first end toward the second end.

31. A method according to claim 30 further comprising the step of releasing the drill motor from the drill plate following drilling operations, said releasing step comprises the step of longitudinally extending the mandrel within the housing such that the plurality of ball bearings move inwardly along a respective inclined surface from the second end toward the first end.

32. A method according to claim 28 further comprising the step of breaking the chip swarf generated during drilling operations into a plurality of chip swarf portions having smaller dimensions.

33. A method according to claim 32 wherein the mandrel defines a fluid injection port extending therethrough, and wherein said step of breaking chip swarf includes the step of injecting fluid into the internal bore of the mandrel to break the chip swarf created during drilling operations into a plurality of smaller chip swarf portions.

34. A method according to claim 31 wherein the clamping device further includes a piston disposed within the housing and dividing the internal cavity of the housing into a rearward portion and a forward portion, wherein the piston cooperatively engages the mandrel and is adapted for longitudinal movement therewith, and wherein the housing defines at least one port extending therethrough which is in fluid communication with the forward portion of the internal cavity, wherein the drill motor comprises a pneumatically actuated motor, and a trigger, responsive to actuation by an operator of the drill motor, for controlling the operation of the drill motor, the drill motor having a first active state in which the drill motor rotates the cutting element during drilling operations, and a second idle state in which the cutting element is rotationally stationary, wherein the method further comprises the step of supplying fluid to the pneumatically actuated motor during the first active state of the drill motor in response to actuation of the trigger, and wherein said retracting step comprises the step of introducing fluid through at least one port of the housing and into the forward portion of the internal cavity, simultaneous with the step of supplying fluid to the pneumatically actuated motor, such that the piston is urged rearwardly within the internal cavity of the housing, thereby longitudinally retracting the mandrel within the housing.

35. A method according to claim 34 further comprising the step of supplying lubricant to the cutting element during the first active state of the drill motor.

36. A method according to claim 34 wherein at least one port of the housing is in fluid communication with the forward portion of the internal cavity, and wherein the drill motor further includes a valve, responsive to actuation of the trigger, for halting the supply of fluid to the pneumatically actuated motor during the second idle state of the drill motor, and wherein said step of longitudinally extending the mandrel comprises the step of introducing fluid through the at least one port of the housing and into the rearward portion of the internal cavity, simultaneous with the step of halting the supply of fluid to the pneumatically actuated motor, such that the piston is urged forwardly within the internal cavity of the housing, thereby longitudinally extending the mandrel within the housing.

* * * * *